United States Patent [19]

Tarukawa et al.

[11] 4,102,972

[45] Jul. 25, 1978

[54] REFRACTORY PIPE FITTINGS AND PRODUCTION THEREOF

[76] Inventors: Tomiji Tarukawa; Hideaki Tarukawa, both of 51-7, Higashiyama-Cho, Itabashi-Ku, Tokyo-To, Japan

[21] Appl. No.: 854,575

[22] Filed: Nov. 25, 1977

Related U.S. Application Data

[63] Continuation of Ser. No. 594,185, Jul. 8, 1975, abandoned.

[30] Foreign Application Priority Data

Jul. 19, 1974 [JP] Japan .................................. 49-82781

[51] Int. Cl.$^2$ .............................................. B28B 1/16
[52] U.S. Cl. ..................................... 264/256; 138/149; 264/46.4; 264/135; 264/265; 264/333; 264/336
[58] Field of Search ............... 138/149; 264/46.4, 46.5, 264/86, 135, 256, 265, 274, 323, 325, 333, 336

[56] References Cited

U.S. PATENT DOCUMENTS

| | | | |
|---|---|---|---|
| 1,363,912 | 12/1920 | Pauly | 264/277 X |
| 1,387,067 | 8/1921 | Murray | 264/135 |
| 2,082,399 | 3/1933 | Isman | 264/325 X |
| 2,309,903 | 2/1943 | Hume | 264/135 X |
| 2,451,046 | 10/1948 | Rembert | 264/270 X |
| 2,816,323 | 12/1957 | Munger | 264/274 X |
| 2,857,931 | 10/1958 | Lawton | 264/135 X |
| 3,130,520 | 4/1964 | Newman | 52/135 |
| 3,217,077 | 11/1965 | Cocke | 264/135 |
| 3,271,236 | 9/1966 | LaBadie | 264/336 X |
| 3,491,171 | 1/1970 | French | 264/46.5 |
| 3,549,737 | 12/1970 | Schulze | 264/333 |
| 3,619,457 | 11/1971 | Chandler | 264/256 |
| 3,787,545 | 1/1974 | Chander | 264/256 |
| 3,985,848 | 10/1976 | Frische | 264/135 X |

Primary Examiner—Thomas P. Pavelko
Attorney, Agent, or Firm—Ladas, Parry, Von Gehr, Goldsmith & Deschamps

[57] ABSTRACT

A refractory pipe fitting has a wall body comprising an inner hollow layer of a synthetic resin, an outer layer made of a refractory, non-metallic, inorganic material, and an intermediate layer made of a flexible material and interposed between the inner and outer layers. Such a pipe fitting can be manufactured by preparing beforehand a composite body comprising an inner layer and an outer layer combined together in an integral manner, placing the composite body in an outer mold, and by filling the gap formed between the outer mold and the composite body with a mixture in a fluid form of a refractory material and water.

5 Claims, 8 Drawing Figures

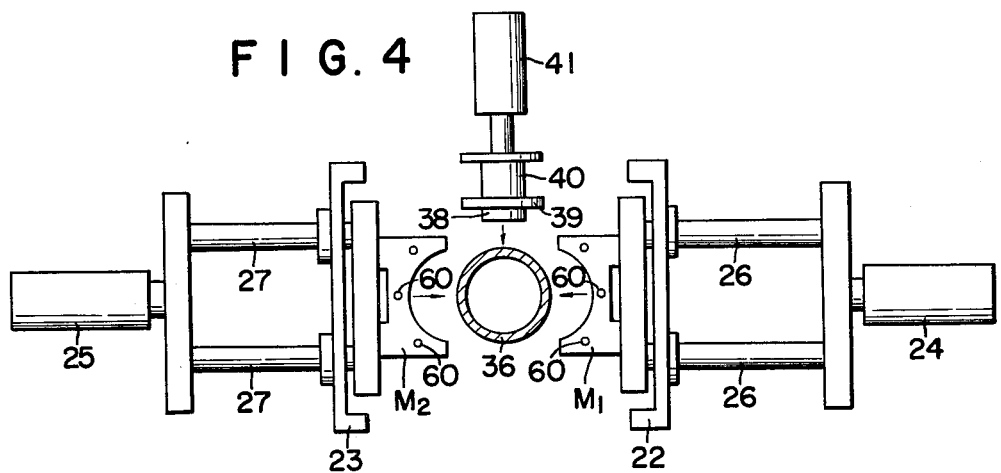
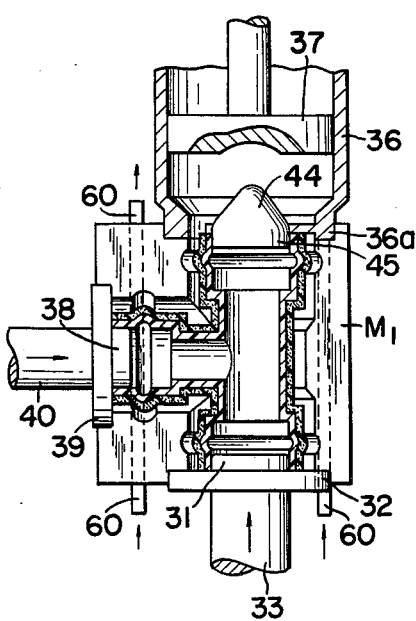
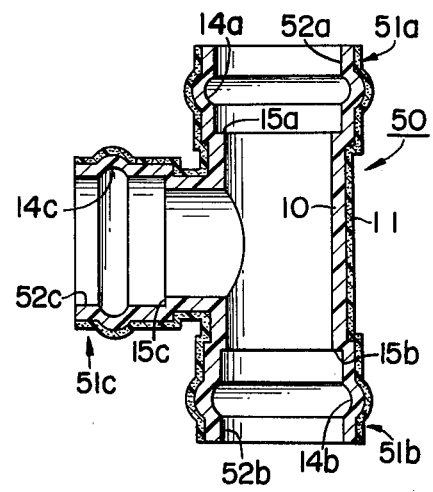

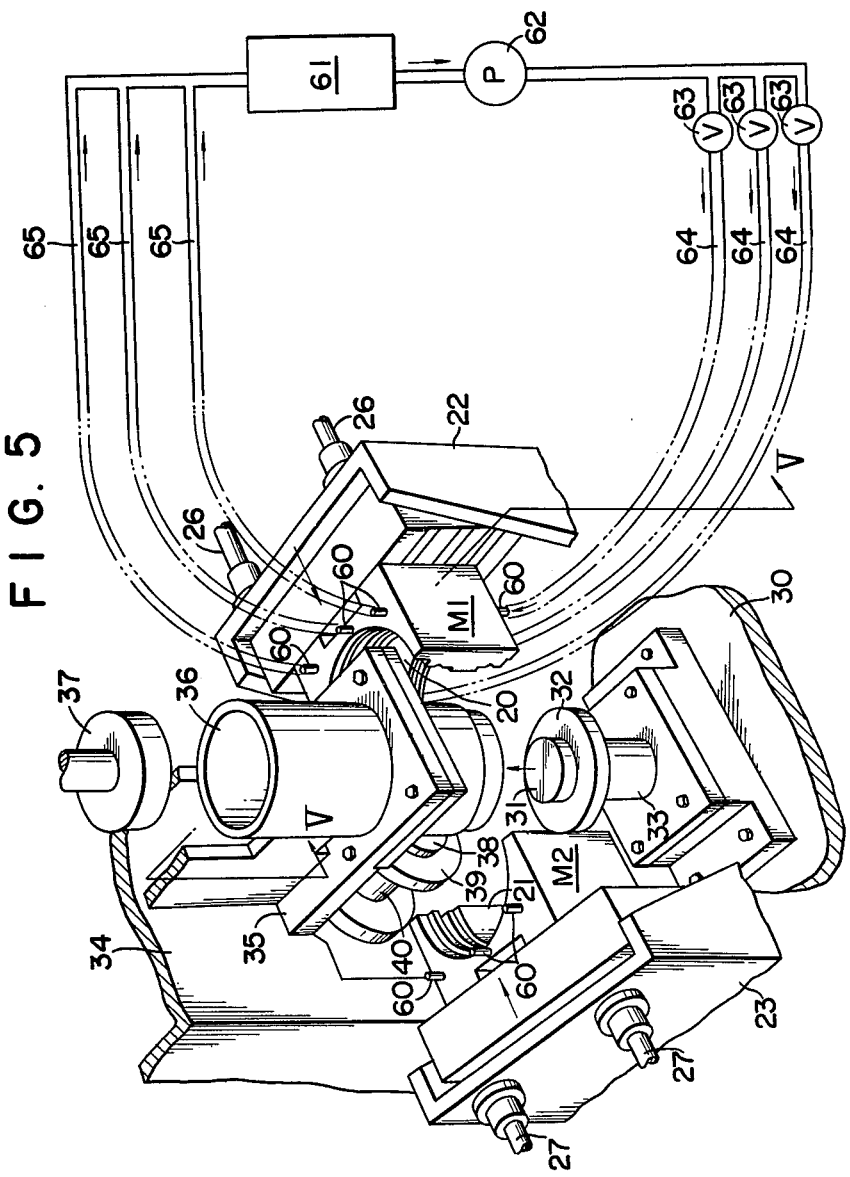

REFRACTORY PIPE FITTINGS AND PRODUCTION THEREOF

This is a continuation of co-pending application Ser. No. 594,185 filed July 8, 1975 and now abandoned.

BACKGROUND OF THE INVENTION

This invention relates to pipe fittings made of refractory material such as asbestos and also to the production thereof.

Heretofore, tubes made of plastic material such as polyvinyl chloride have been used as water supplying and draining pipes in buildings and the like, and for connecting these pipes, pipe fittings also made of plastic material are used.

Although the pipes and pipe fittings made of plastics can be easily handled and worked, and, furthermore, the costs thereof are comparatively low, the pipes and pipe fittings are easily melted at high temperatures to which they are subjected in the event of a fire in a building in which they are installed and are easily burnt to generate poisonous gases, thus constituting a serious hazard to human lives. In addition, when the pipes and pipe fittings are burnt, a great amount of heat is generated, which accelerates expansion of the fire.

Metal tubes and metal pipe fittings also have been used for water supply lines and water draining line, and these have been found advantageous because of their high mechanical strength and high heat resistance. However, metal tubes and metal pipe fittings have been accompanied by the problems of comparatively high cost and low corrosion resistance. Furthermore, the heat conductivity of metal tubes and metal pipe fittings is substantially high, and therefore when cold water flows through the interior of a pipe line made of metal tube and metal pipe fittings, dew frequently collects on the outer surface of the piping, and corrosion of the pipe line is thereby accelerated.

Pipes and pipe fittings made of refractory materials such as concrete, asbestos, portland cement, and the like are known. However, these pipes and pipe fittings are ordinarily water permeable, and it has been difficult to apply them to the construction of water supply lines and drainage lines in buildings.

SUMMARY OF THE INVENTION

With the above described problems of the conventional pipes and pipe fittings in view, a primary object of the present invention is to provide a pipe fitting which is highly heat-resistant and anti-corrosive and can be used for flow therethrough of various fluids inclusive of water, and whose production cost is comparatively low.

Another object of the invention is to provide a refractory pipe fitting having an inner layer made of a synthetic resin, an outer layer made of a refractory material, and an intermediate layer made of a flexible material. By the provision of the intermediate layer, any deformation, expansion or contraction which is liable to occur in the inner or outer layer can be absorbed, and the development of cracks in the outer layer made of nonelastic material can be prevented.

Still another object of the invention is to provide a method through which a refractory pipe fitting of the above described nature can be produced in a simple manner.

According to the present invention, there is provided a refractory pipe fitting the wall of which comprises an inner hollow layer made of a synthetic resin, an outer layer made of a refractory, non-metallic, inorganic material, and an intermediate layer made of a flexible material and interposed between the inner and outer layers.

The refractory material forming the outer layer comprises asbestos, rockwool, glass fibers, or the like, and a binder such as portland cement or plaster. The flexible material forming the intermediate layer is any of suitable deformation absorbable material of resinous or fibrous constitution.

In another aspect of the present invention, there is further provided a method for producing a refractory pipe fitting having an inner hollow layer made of a synthetic resin, an outer layer made of a refractory, non-metallic, inorganic material, and an intermediate layer made of a flexible material interposed between the inner and outer layers, this method comprising the steps of preparing an outer mold internally forming a molding cavity conforming to the outer configuration of the outer layer and a composite body comprising the intermediate layer attached onto the outer surface of the inner layer made of a synthetic resin, placing the composite body in the molding cavity formed in the outer mold thereby providing a molding gap between the inner surface of the outer mold and the outer surface of the composite body, filling under pressure the molding gap with a mixture, in the form of fluid, comprising a refractory, non-metallic, inorganic material and water for solidifying the material, and opening the outer mold thereby to deliver the now solidified refractory, non-metallic, inorganic material combined with the composite body made of synthetic resin-made inner layer attached with the intermediate layer.

The invention will be more clearly understood from the following detailed description of the invention when read in conjunction with the accompanying drawings, throughout which like parts are designated by like reference numerals and characters.

BRIEF DESCRIPTION OF THE DRAWINGS

In the drawings:

FIG. 4 is a plan view, partly in section, of a molding machine for producing the pipe fitting shown in FIG. 1;

FIG. 5 is a perspective view, combined with a schematic fluid flow diagram, showing essential parts of the molding machine indicated in FIG. 4;

FIG. 7 is a longitudinal sectional view of the outer mold shown in FIG. 6, which is closed with a core inserted therein in readiness for the molding operation; and FIG. 8 is a sectional side view of a core to be inserted in the outer mold shown in FIG. 6.

DETAILED DESCRIPTION

Figure 1:
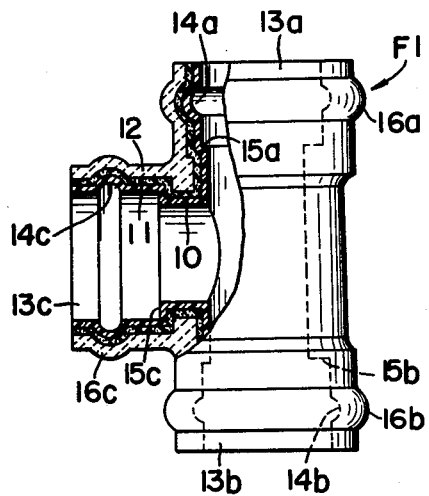
FIG. 1 is a side view, partly in section, of an example of a refractory pipe fitting according to the present invention.

Referring now to FIG. 1, there is shown an example of a refractory pipe fitting generally designated by F1. This fitting, which is a Tee, comprises an inner layer 10 made of a synthetic resin formed into a hollow structure, an outer layer 12 made of a refractory material, and an intermediate layer 11 made of a flexible material provided between the inner layer 10 and the outer layer 12.

The inner layer 10, which is rigid and hollow, is formed entirely of a synthetic resin such as polyvinyl chloride, polyethylene, polystyrene, polypropylene, polyamide, polycarbonate, polyester, epoxide, and the like. The inner layer 10 is further provided with three socket or bell parts 13a, 13b, and 13c, each for receiving an end of a pipe. Annular grooves 14a, 14b, and 14c are provided internally of the socket parts 13a, 13b, and 13c for receiving packing rings (not shown), respectively. Furthermore, annular steps or shoulders 15a, 15b, and 15c are provided at the bottoms of the socket parts 13a, 13b, and 13c, so that the ends of the pipes inserted in the sockets abut against the annular steps or shoulders 15a, 15b, and 15c, respectively.

The flexible material forming the intermediate layer 11 may be made of a foamed resin such as polystyrene, polyvinyl chloride, polyethylene, polyurethane, and the like. Alternatively, the flexible material may be made of a thin laminated body formed by fibers of a suitable material such as asbestos and polyamide resin. A flexible material of the above described composition is attached to the outer surface of the hollow member constituting the inner layer 10 by the aid of a suitable adhesive agent.

The outer layer 12 is made of a refractory, non-metallic, inorganic substance which is secured through the interposition of the intermediate layer 11 to the inner layer 10 in an integral manner. The refractory, nonmetallic, inorganic substance may be a refractory material such as asbestos, rock wool, glass fiber, and sand, particularly of silica, and also of a binder such as portland cement, plaster, and the like. A most preferable combination thereof consists of asbestos and portland cement. It is also possible to use mere a combination of fire clay and portland cement or plaster.

A mixture of refractory material and a binder for constructing the outer layer 12 is further kneaded with water so that a fluid mixture is obtained, and the mixture thus obtained is thereafter attached to the outer surface of a composite body made beforehand of the intermediate layer and inner layer in an integral manner. When the outer layer is made of a combination of asbestos and portland cement, it is preferable that 15 through 20 parts by weight of asbestos be mixed with from 85 to 80 parts by weight of portland cement, and to 100 parts of the mixture thus obtained, from 18 to 20 parts by weight of water is further added. As described hereinafter in more detail, the outer layer 12 is formed from the above described mixture so that outwardly projecting annular portions 16a, 16b, and 16c are provided at positions corresponding to the annular grooves 14a, 14b, and 14c formed in the inner layer 10, respectively.

A refractory pipe fitting F1 constructed as described above preserves the socket parts 13a, 13b, and 13c of the afore described configurations. When pipes are to be connected to the pipe fitting F1, the ends of the pipes are inserted into the socket portions 13a, 13b, and 13c until the ends of the pipes abut against the annular steps 15a, 15b, and 15c, respectively. Furthermore, packing rings provided in the annular grooves 14a, 14b, and 14c are resiliently urged against the outer surfaces of the pipes and the inner surfaces of the socket parts 13a, 13b, and 13c, respectively, so that a fluid-tight seal is obtained at each of the joining positions between the pipes and the pipe fitting. A wall construction of the pipes to be used with the pipe fitting F1 which is similar to that of the pipe fitting is advantageous.

When a fluid such as water is passed through a pipe line assembled from the pipes and pipe fittings as described above, there is no possibility of the fluid permeating through the walls of the pipes and the pipe-fittings because the internal surface of each pipe and pipe coupling is made of a synthetic resin. Furthermore, in the event that a fire breaks out, any possibility of the pipe fitting being burnt or damaged can be eliminated by virtue of the outer layer 12 made of a refractory material.

However, since the inner layer 10 and the outer layer 12 are made of materials of different qualities, relative displacement or deformation tends to occur between the two layers because of various stresses exerted at the time of assembling or expansion and contraction of these layers caused by temperature variation or application of an external force during its usage. Thus, the outer layer 12, which is rather brittle and of lower mechanical strength, is liable to be broken. The intermediate layer 11 effectively prevents such damage or deterioration.

Since the intermediate layer 11 made of a flexible material is integrally combined between the outer layer 12 and the inner-layer 10, any tendency of deformation being caused in either of the two layers can be absorbed. It should be noted that the provision of the intermediate layer throughout the entire space between the two layers is not necessary, and the intermediate layer may be provided only at separate positions suitable for this purpose.

Figure 2:
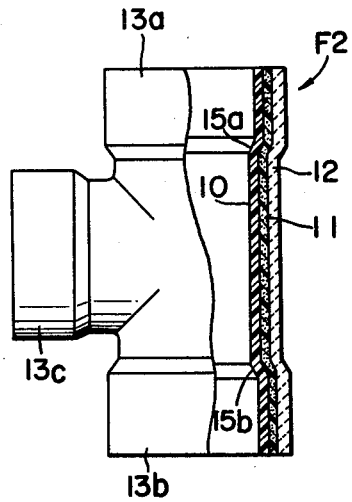
FIG. 2 is a side view, partly in section, of another example of the refractory pipe fitting of this invention.

In FIG. 2, there is shown another example F2 of the pipe-fitting which constitutes a modification of pipe fitting F1 illustrated in FIG. 1. This example F2 is different from the example F1 in that no annular grooves 14a, 14b, and 14c, and hence no outwardly projecting annular parts 16a, 16b, and 16c are provided, and that the stepped parts 15a, 15b, and 15c provided in the sockets or bells 13a, 13b, and 13c are formed as conical surfaces, respectively.

Figure 3:
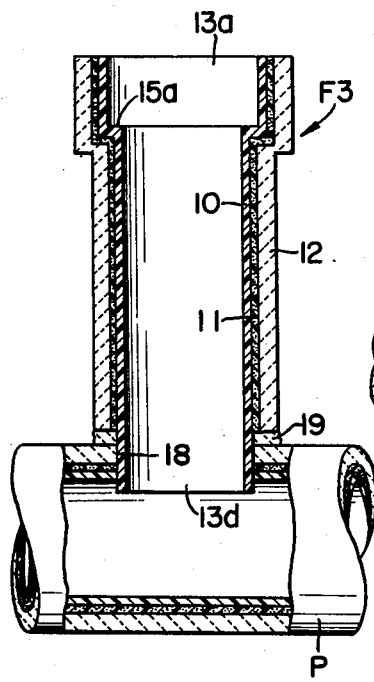
FIG. 3 is a longitudinal sectional view of still another example of the refractory fitting of this invention.

In still another example F3 of the pipe fitting shown in FIG. 3, there are provided one socket or bell part 13a at the outer end of a straight pipe part 13d to be inset at the other end thereof into the wall of another pipe member. In the socket part 13a, an end of a pipe (not shown) is inserted. At the inset part 13d, an inner layer 10 thereof is exposed to the outside. When the inset part 13d has been inserted into a hole 18 provided through the wall of the other pipe P, a refractory mortar 19 is caulked or grouted into the joining part between the fitting F3 and the pipe P.

It will be apparent that the examples of the pipe fittings shown in FIGS. 2 and 3 afford advantageous features similar to those of the pipe fitting shown in FIG. 1.

The pipe fitting F1 shown in FIG. 1 can be manufactured by an apparatus as shown in FIGS. 4 through 7, use being made of a composite body as shown in FIG. 8. In the apparatus shown in FIGS. 4 and 5, there are provided a pair of mold-halves $M_1$ and $M_2$ constituting a composite outer mold. The mold-halves $M_1$ and $M_2$ are horizontally movable in the arrow directions for opening and closing the outer mold. The mold-halves $M_1$ and $M_2$ have recesses 20 and 21 facing each other which form a molding cavity when the mold-halves $M_1$ and $M_2$ are closed together. The mold-halves are integrally mounted respectively on platens 22 and 23, which are horizontally driven by hydraulic cylinders 24 and 25 through rods 26 and 27. A hydraulic cylinder (not shown) is disposed on a base plate 30 of the apparatus and is operable to drive in vertical direction a piston rod 33 bearing a core positioning member 31 and a flange 32.

The apparatus also provides a frame 32 erected on the rear part of the apparatus, on which frame 34, a horizontally extending bracket 35 is integrally secured in a suitable manner. A material-supplying vertical cylinder 36 is supported on the horizontal bracket 35. A material in the cylinder 36 is pushed out of the cylinder 36 downwardly by a plunger 37 freely reciprocable in the cylinder 36. The plunger 37 may be operated vertically by suitable means such as a power cylinder, screw drive, or foot-stamping or pedal device.

Another core positioning member 38 having a flange 39 is disposed in a rear part of the apparatus, and is driven by a power cylinder 41 so that the member 38 is moved in a horizontal direction perpendicular to the moving direction of the mold-halves toward and away from the mold-halves.

The first and second core positioning members 31 and 38 respectively having flanges 32 and 39 are thus driven in a cooperative manner with the mold-halves $M_1$ and $M_2$, and when these members are moved toward the mold-halves until they are combined with the mold-halves, a mold cavity is formed therebetween.

Figure 6:
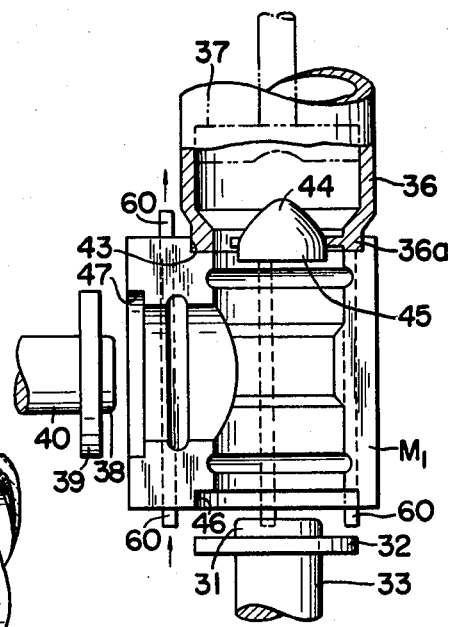
FIG. 6 is a sectional view, inclusive an outer mold, taken along the line VI—VI in FIG. 5.

As specifically indicated in FIG. 6, the material supplying cylinder 36 has a reduced diameter part 36a at the lower end thereof, and the outer diameter of the reduced diameter part 36a is so selected that it is substatially equal to the diameter of a counterbore 43 formed in the mold-halves $M_1$ and $M_2$. Thus, the reduced diameter part 36a of the cylinder 36 is snugly received in the counter-bore 43 of the mold-halves. That is, the vertical position of a flat surface provided at the lower end of the cylinder 36 is brought down into the plane formed by the bottom surface of the counter-bore 43.

Within the material supplying cylinder 36, there is provided a material guiding block 44 formed integrally with the cylinder 36. The lower part of the material guiding block 44 is formed into a projection 45 snugly engageable with the opening 52 of a socket 51a formed in a core 50 indicated in FIG. 8. In this example, the diameter of the material supplying cylinder 36 is selected to be greater than that of the reduced diamter part 36a thereby to facilitate material supply. However, it is also possible to make the diameter of the part 36a equal to that of the material supplying cylinder 36.

The mold core 50 indicated in FIG. 8 actually comprises an inner layer 10 and an intermediate layer 11 formed in the wall of the pipe fitting F1 shown in FIG. 1, but when the pipe fitting F1 is formed in the above described molding apparatus, the core 50 functions as an ordinary molding core.

The inner diameters of the opening 52b of a socket 51b in the core 50 and the opening 52c of another socket 51 in the same core 50 are so selected they conform with the outer diameters of the core positioning members 31 and 38, respectively. In addition, the outer diameters of the flanges 32 and 39 are made equal to the diameters of the recesses 46 and 47 of the mold-halves.

As a matter of course, the shape of the molding cavity formed by the recesses 20 and 21 in the mold-halves $M_1$ and $M_2$ conforms to the outer configuration of the pipe fitting F1.

The mold-halves $M_1$ and $M_2$ are provided with heater pipes 60 passing therethrough, and a heating medium such as hot water is circulated in the pipes 60. As is apparent in FIG. 5, the heating medium which has been heated in a heating device 61 and forced by a pump 62 to flow through a valve 63 and a hose 64 is supplied to an entrance of the heating pipes 60, and the medium which has thus heated the mold-halves $M_1$ and $M_2$ is returned through a delivering hose 65 to the heating device 61.

Before the start of the molding operation, the mold-halves $M_1$ and $M_2$ are separated from each other horizontally as shown in FIG. 5, and the lower and rear core-positioning members 31 and 38 are also in the retracted positions. In this state, a core 50 is placed on the flange 32 with the socket part 51b thereof engaging the core positioning member 31. The core positioning member 31 supporting the core is then moved upward by means of a cylinder not shown.

When the core 50 placed on the core positioning member 31 is elevated to a position as indicated in FIG. 7, the downward projection 45 of the material guiding block 44 is seated snugly in the socket part 51a of the core 50, so that the core 50 is held accurately at the center of a mold cavity to be formed by the mold-valves. It should be noted that, instead of the arrangement wherein the core 50 is positioned by means of the core-positioning member 31 and the material guiding block 44 in the material supplying cylinder 36, the apparatus may also be so arranged that the core 50 is held in its position by a single core positioning member 31. In this case, the material guiding block 44 is not necessarily formed integrally with the material supplying cylinder 36, but it may be provided separately and placed on the upper end of the core 50 in a suitable manner. The core positioning member 31 in this case is extended to a higher level in the core 50. After the core 50 is held in a position supposedly at the center of the molding cavity, the mold-halves $M_1$ and $M_2$ are advanced toward each other until the mating faces of the mold-halves $M_1$ and $M_2$ engage snugly, and the mold is thereby tightly closed. At this instant, the counterbore 43 formed in the mold tightly receives the part 36a of the material supplying cylinder 36.

Then, the hydraulic cylinder 41 for the rear core positioning member 38 is so operated that the member 38 advances toward the mold thus closed until it is snugly received in the horizontally disposed socket 51c in the core 50, and the ultimate position of the core 51 is thereby defined. In the ultimate position, the flange 39 of the rear core-positioning member 38 is held in engagement with the counterbore 47 of the mold, whereby the mold is completely closed, thereby providing a mold cavity. A refractory material stored in the material guiding cylinder 36 is then supplied under pressure into the mold cavity.

As for the material to be molded in the mold cavity, any of the hereinbefore described compositions may be used. In the case where a combination of asbestos and portland cement is used, water is added thereto in the hereinbefore described ratio, and the mixture is kneaded. During the kneading operation, additives for improving the water-sustaining nature, plasticity, and workability of the material may be added advantageously. The additive may comprise a single substance or a combination of substances selected from hydroxyl propylmethyl cellulose, carboxymethyl cellulose, methyl cellulose, polyvinylalcohol, vinylacetate emulsion, ethyleneoxide, acrylamide, acrylic acid copolymer, and the like.

In order to forcibly supply the refractory material into the mold cavity, the plunger 37 may be depressed in the material supplying cylinder 36 by a suitable driving device such as a screw type driving device. The pressure pressure at this time is preferably in a range of from 10 to 30 kg/cm$^2$.

As described hereinbefore, the mold-halves $M_1$ and $M_2$ are provided with heating pipes 60, and a heating medium is circulated therethrough by means of the pump 62. The temperature and the flow-rate of the heating medium are preferably such that the temperature of the surface of the mold contacting the molded material ranges from 75° to 100° C. Alternately, electric heating wires may be embedded in the mold-halves so that the above described temperature range is maintained in the mold-halves.

After the completion of the pressurized supply of the refractory molding material into the mold, the mold-halves $M_1$ and $M_2$ are moved in reverse directions to those described above, thereby opening the mold. The outer layer 12 thus molded on the surface of the core 50 is taken out of the mold-halves in a state wherein it is attached to the composite core 50 and is cured.

As described hereinbefore, the core 50 comprises an inner layer 10 and an intermediate layer 11 of the pipe coupling to be manufactured, whereby a pipe fitting F1 comprising an inner layer, an intermediate layer, and an outer layer integrally combined into one structure can be obtained. The pipe fitting F1 thus formed has high strength and low permeability.

According to the above described method for producing a pipe fitting, the molding mixed material comprising a refractory material and water is heated by a heating device as described above while the material is molded in the mold. This heating process affords advantageous features as follows.

A refractory material, or more specifically asbestos-cement, is liable to stick to the mold surfaces, and this has frequently given rise to difficulty in removing the molded product out of the mold. This difficulty can be obviated by heating the mold to the extent that water contained in the mixed material is thereby evaporated and a thin layer of water vapor is formed between the mold and the outer surface of the molded product. The thin layer of water vapor acts as a lubricating film between the mold and the outer surface of the molded product, and the removal of the latter out of the mold is thereby facilitated. Facility in removal of the product further eliminates any possibility of damaging the partly dried product when the latter is delivered from the mold-halves.

It will be apparent to those skilled in the art that modifications F2 and F3 of the pipe fitting may also be produced in a similar manner when the configurations of the recesses in the mold-halves provided in a moding apparatus shown in FIGS. 4 through 6, and also of the core are selected suitably.

While the foregoing description of the invention has been set forth with respect a Tee as a representative pipe fitting, it should be understood, of course, that the invention is equally and effectively applicable to other pipe fittings, examples of which are elbows, crosses, Y-branches, reducers (and expanders), and couplings.

We claim:

1. A method for producing a refractory pipe fitting having a hollow and rigid inner layer made of a synthetic resin, an outer layer made of a refractory material comprising non-metallic inorganic fibers and inorganic binder material, and an intermediate layer made of a flexible foamed synthetic resin interposed between the inner and outer layers for securing these layers and for permitting displacement and deformation of the inner and outer layers relative to each other, comprising the steps of preparing an outer mold internally formed with a molding cavity conforming to the outer configuration of the outer layer, preparing a composite body made up of a shell of the synthetic resin, which is to form said inner layer, and a thin layer of the flexible foamed synthetic resin, which is attached to the outer surface of the shell and is to form said intermediate layer, placing the composite body in said molding cavity to provide a mold gap between the inner surface of the outer mold and the outer surface of the thin layer of the composite body, preparing a mixture of said inorganic fibers and said binder material, kneaded with water, forcibly supplying the kneaded mixture under pressure into said mold gap to carry out a molding operation in which the mixture is adhered to the layer of the flexible foamed synthetic resin, heating the outer mold internally during the molding operation to cause the water in the mixture being molded to be evaporated to form a thin lubricating film of water vapor between the mold and the outer surface of the pipe fitting being molded, and opening the outer mold, after the completion of the molding operation, to take out the molded pipe fitting with said shell attached to the inner surface of the molded outer layer through said thin layer of the flexible foamed synthetic resin.

2. The method as set forth in claim 1, wherein the outer mold is heated at a temperature between 75° and 100° C.

3. The method as set forth in claim 1, wherein the kneaded mixture is forced into the mold gap at a pressure between 10 and 30 kg/cm$^2$.

4. The method as set forth in claim 1, further indicating the step of mixing in said kneaded mixture additives for improving the water-retaining nature, plasticity and workability of the mixture.

5. The method as set forth in claim 1, wherein said inorganic fibers are of asbestos and said binder material is portland cement and wherein said kneaded mixture comprises 15 to 20 parts by weight of asbestos, 85 to 80 parts by weight of portland cement, and 18 to 20 parts by weight of water.

* * * * *